US006796705B1

(12) United States Patent
Khubani

(10) Patent No.: US 6,796,705 B1
(45) Date of Patent: Sep. 28, 2004

(54) MOTORIZED FROTHING MUG AND METHOD OF USING SAME

(75) Inventor: Ashok Khubani, Boonton, NJ (US)

(73) Assignee: OnTel Products Corp., Fairfield, NJ (US)

( * ) Notice: Subject to any disclaimer, the term of this patent is extended or adjusted under 35 U.S.C. 154(b) by 0 days.

(21) Appl. No.: 10/431,023

(22) Filed: May 6, 2003

(51) Int. Cl.⁷ ................................................ A47J 43/27
(52) U.S. Cl. ...................... 366/197; 366/314; 366/348; 426/519
(58) Field of Search ............................... 366/314, 325.6, 366/348, 349, 197; D7/378; 99/275; 426/516

(56) References Cited

U.S. PATENT DOCUMENTS

| | | | |
|---|---|---|---|
| 504,112 A | | 8/1893 | Paine |
| 533,589 A | * | 2/1895 | Hagley ..................... 366/325.6 |
| 632,780 A | | 9/1899 | Crepeau |
| 1,140,341 A | | 5/1915 | Johnston et al. |
| 1,627,315 A | | 5/1927 | Boynton |
| D121,299 S | | 7/1940 | Krebs |
| 2,278,398 A | | 3/1942 | Wittmann |
| 2,798,702 A | | 7/1957 | Fjellstedt |
| 2,807,477 A | * | 9/1957 | Vaughan ..................... 280/407 |
| 2,820,619 A | * | 1/1958 | Dache ......................... 366/317 |
| 2,920,875 A | * | 1/1960 | Marfuggi ..................... 366/197 |
| 3,117,769 A | | 1/1964 | Spingler |
| 4,435,084 A | | 3/1984 | Calhoun et al. |
| 4,887,909 A | * | 12/1989 | Bennett ....................... 366/199 |
| D313,533 S | | 1/1991 | Rixen |
| D327,603 S | | 7/1992 | Van Asten |
| 5,425,579 A | * | 6/1995 | Sampson ..................... 366/314 |
| 5,482,367 A | | 1/1996 | Khan et al. |
| D371,044 S | | 6/1996 | Bourassa |
| 5,580,169 A | * | 12/1996 | Ghidini ....................... 366/256 |
| 5,639,161 A | | 6/1997 | Sirianni |
| 5,692,830 A | * | 12/1997 | Costanzo ..................... 366/205 |
| 5,720,552 A | | 2/1998 | Schindlegger |
| D391,802 S | * | 3/1998 | Wong .......................... D7/378 |
| 5,725,305 A | | 3/1998 | Delbor |
| 5,855,431 A | | 1/1999 | Costanzo |
| D406,216 S | | 3/1999 | Renner |
| 5,908,241 A | | 6/1999 | Bliss et al. |
| 5,911,504 A | | 6/1999 | Schindlegger, Jr. |
| D421,872 S | | 3/2000 | Wong |
| D423,872 S | | 5/2000 | Blaise |
| D425,380 S | | 5/2000 | Gartz |
| 6,200,015 B1 | | 3/2001 | Gartz et al. |
| 6,283,625 B2 | * | 9/2001 | Frankel et al. ............... 366/205 |
| D452,111 S | | 12/2001 | Lane |
| D453,664 S | | 2/2002 | Brady |
| 6,467,948 B1 | * | 10/2002 | Lawson ....................... 366/314 |
| 2001/0036124 A1 | * | 11/2001 | Rubenstein ................. 366/205 |

FOREIGN PATENT DOCUMENTS

| | | | |
|---|---|---|---|
| EP | 0562310 | | 9/1993 |
| WO | WO 99/124458 | * | 3/1999 |

* cited by examiner

Primary Examiner—Tony G. Soohoo
(74) Attorney, Agent, or Firm—Cooper & Dunham LLP

(57) ABSTRACT

A frothing mug includes a mug portion holding a first liquid, a whisk extending into the mug portion, a means for rotating the whisk and a base supporting the mug portion and the whisk and providing the means for rotating the whisk to aerate the liquid. A method of frothing a liquid using the mug includes pouring a quantity of a first liquid into the mug portion such that a portion of the whisk is, or will be, exposed to the air and a portion of the whisk is, or will be, immersed in the first liquid, activating the means for rotating the whisk to froth the liquid and deactivating the means for rotating the whisk after the first liquid is sufficiently frothy.

16 Claims, 6 Drawing Sheets

MOTORIZED FROTHING MUG AND METHOD OF USING SAME

FIELD OF THE DISCLOSURE

The present disclosure relates to a motorized frothing mug and a method of using the same. More specifically, the present disclosure describes a method and device for frothing milk or another liquid in a mug including a mug portion, a whisk extending into the mug portion, a means for rotating the whisk and a base supporting the whisk and housing the means for rotating the whisk. Milk, or another liquid, is poured into the mug portion to a predetermined level. The mug can also be tilted such that a portion of the whisk is submerged in the liquid and a portion of the whisk is exposed to the air. The means for rotating the whisk is activated via a switch and the rotation of the whisk aerates the liquid to provide a frothy consistency. Coffee or another liquid may then be poured into the mug portion resulting in a beverage with a layer of frothed liquid on top.

BACKGROUND OF THE ART

The popularity of coffee based drinks has recently increased. Today, a variety of such coffee beverages are commonly available in a variety of locations. These beverages are often served with a layer of frothed milk or another liquid, such as cream, skim milk or non-dairy creamer as a topping. Traditionally, such toppings are made at the location by a machine, such as a cappuccino machine, where steam is passed through a liquid to create a frothy consistency. The frothy liquid is then generally spooned onto the beverage. While many restaurants and cafes have access to such machines, the machines are costly and are not commonly owned by individuals. Typically, individuals generally must travel to a location such as a restaurant or cafe which has such a machine.

Some machines are available for home use which are similar to those steam-based machines used in the restaurant business, however, these home versions are also expensive and can be difficult to operate.

Alternative machines for creating froth are available, but these alternatives have shortcomings. For example, U.S. Pat. No. D452,111 to Lane ("Lane Patent") apparently illustrates a motorized hand-held whisk that could be used to froth a liquid. While the hand-held whisk of the Lane Patent is likely less expensive and easier to use than a steam-based machine, like the steam-based machines, a separate machine is required to create the froth, which requires additional clean-up. Incorporating a means for frothing a liquid right in the mug or cup into which the beverage featuring the frothed liquid is to be served would simplify both the process of preparing the beverage and clean-up afterward.

Certain products incorporate a mixing device in a cup or mug. For example, U.S. Pat. No. 4,435,084 to Calhoun et al. ("Calhoun Patent") proposes an automatic stirrer for a cup. The cup of the Calhoun Patent includes an upwardly open receptacle and a bottom portion formed below the receptacle, which permits access from below. A bore in the bottom portion allows a shaft journalled in the bottom portion to extend into the receptacle. The shaft is connected to a blade structure on an upper end which is rotated using a motor or by hand from the bottom recess.

Similarly, U.S. Pat. No. 5,720,552 to Schindlegger ("Schindlegger Patent") relates to a drinking glass with an integrated stirring assembly. The glass includes a base with an attached cylindrical top. A stirrer is rotatably attached through the top of the base so as to extend into the area subtended by the top and is actuated by a motor in the base. In the Schindlegger Patent, the stirring tool is a heart shaped bail whose pointed end is joined to a mating section to form a single unit and whose cleft portion has a spherical protrusion which helps center the tool during rotation.

While the Calhoun Patent and the Schindlegger Patent propose mugs or cups including stirring mechanisms, neither of these devices would be suitable for frothing a liquid. Further, the blades of the Calhoun Patent and the stirrer of the Schindlegger Patent are designed to mix two or more liquids which are already combined, and further, do not incorporate sufficient air into a liquid in order to provide a frothy consistency.

Accordingly, it is desirable to provide a mug including a frothing mechanism. More specifically it is desirably to provide a motorized frothing mug and a method of using the same.

SUMMARY OF THE DISCLOSURE

A method of frothing liquids in a mug having a mug portion and a whisk extending into the mug portion from a base which supports the mug portion and the whisk and provides means for rotating the whisk includes pouring a quantity of a first liquid into the mug portion such that a level of the first liquid in the mug portion is at least at a height of the whisk, activating the means for rotating the whisk to rotate the whisk so as to aerate the first liquid and deactivating the means for rotating the whisk after the first liquid has achieved a desired frothy consistency. The method may also include pouring a second liquid into the mug portion such that the first liquid having the desired frothy consistency floats on the second liquid.

The level of the first liquid may be above the height of the whisk such that when the means for rotating the whisk is activated to rotate the whisk, the level of at least a portion of the first liquid drops such that the rotation of the whisk aerates the first liquid. Alternatively, the level may be such that a top portion of a coil portion of the whisk is exposed to air and a bottom portion of the coil portion is immersed in the first liquid.

The means for rotating the whisk may be an electric motor. The activating step and the deactivating step may be accomplished utilizing a switch.

A method of frothing liquids in a mug having a mug portion and a whisk extending into the mug portion from a base which supports the mug portion and the whisk and provides a means for rotating the whisk which includes pouring a quantity of a first liquid into the mug portion, tilting the mug in a first direction such that a portion of a coil portion of the whisk is immersed in the first liquid and a remaining portion of the coil portion is exposed to air, activating the means for rotating the whisk to rotate the whisk so as to aerate the first liquid and deactivating the means for rotating the whisk after the first liquid has achieved a desired frothy consistency.

The method may include tilting the mug in a second direction such that a different portion of the coil portion is immersed in the first liquid and a different remaining portion of the coil portion is exposed to air, activating the means for rotating the whisk to rotate the whisk so as to aerate the first liquid and deactivating the means for rotating the whisk after the first liquid has achieved a desired frothy consistency.

The method may include pouring a second liquid into the mug portion such that the first liquid having the desired frothy consistency floats on the second liquid.

The means for rotating the whisk may be an electric motor. The activating step and deactivating step may be accomplished utilizing a switch.

A mug may include a mug portion adapted to hold at least a first liquid, a whisk extending into the mug portion and adapted to aerate the first liquid, a base on which the mug portion is mounted and that supports the mug portion and the whisk and means for rotating the whisk housed in the base with a shaft extending through a top surface of the base into the mug portion and connected to the whisk, wherein the means for rotating the whisk rotates the whisk to aerate the first liquid to a desired frothy consistency.

The mug portion may include an open top end and an open bottom end, wherein the bottom end includes a securing flange.

The base may include a top surface with a raised center section, a peripheral wall extending around an outer periphery of the base, an outer lip positioned on the top surface around the outer periphery of the base such that a space is formed between the raised center section and the outer lip and a securing ridge formed on an inner surface of the outer lip around at least a portion of the outer lip such that the securing ridge interacts with the securing flange of the mug portion to secure the mug portion to the base. The base may also include a rubber ring formed around the raised center section of the top surface of the base where the raised center section and the rubber ring fit inside the bottom end of the mug portion when the mug portion is mounted on the base to prevent liquid from leaking out of the mug portion.

The means for rotating the whisk may be an electric motor. The base may include a battery mount adapted to mount at least one battery in the base to provide electrical power to the electric motor, wherein the battery mount includes at least one battery terminal electrically connected to the electric motor. The base may further include a switch mounted on the peripheral wall of the base and electrically connected between the battery terminal and the electric motor to control the electrical power provided to the electric motor.

DETAILED DESCRIPTION OF PREFERRED EMBODIMENTS

Figure 1:
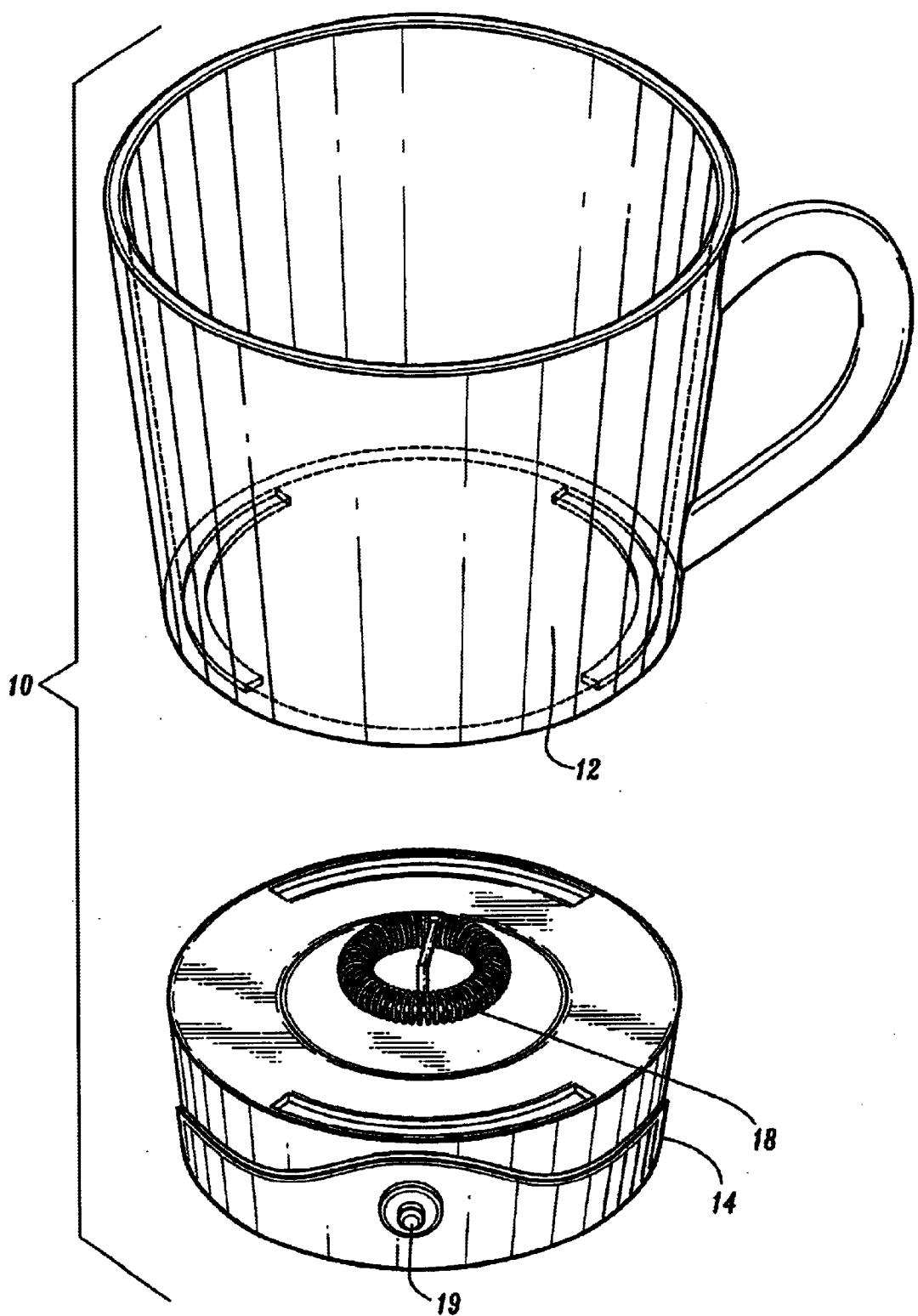
FIG. 1 is a diagram of a motorized frothing mug according to an embodiment of the present invention.

FIG. 1 illustrates a motorized frothing mug 10 according to an embodiment of the present invention including a mug portion 12 mounted on a base 14. A whisk 18 is supported on the base and extends into the mug portion 12. The base 14 houses means for rotating the whisk, such as an electric motor 56 (see FIG. 5), in order to froth a liquid.

Figure 2:
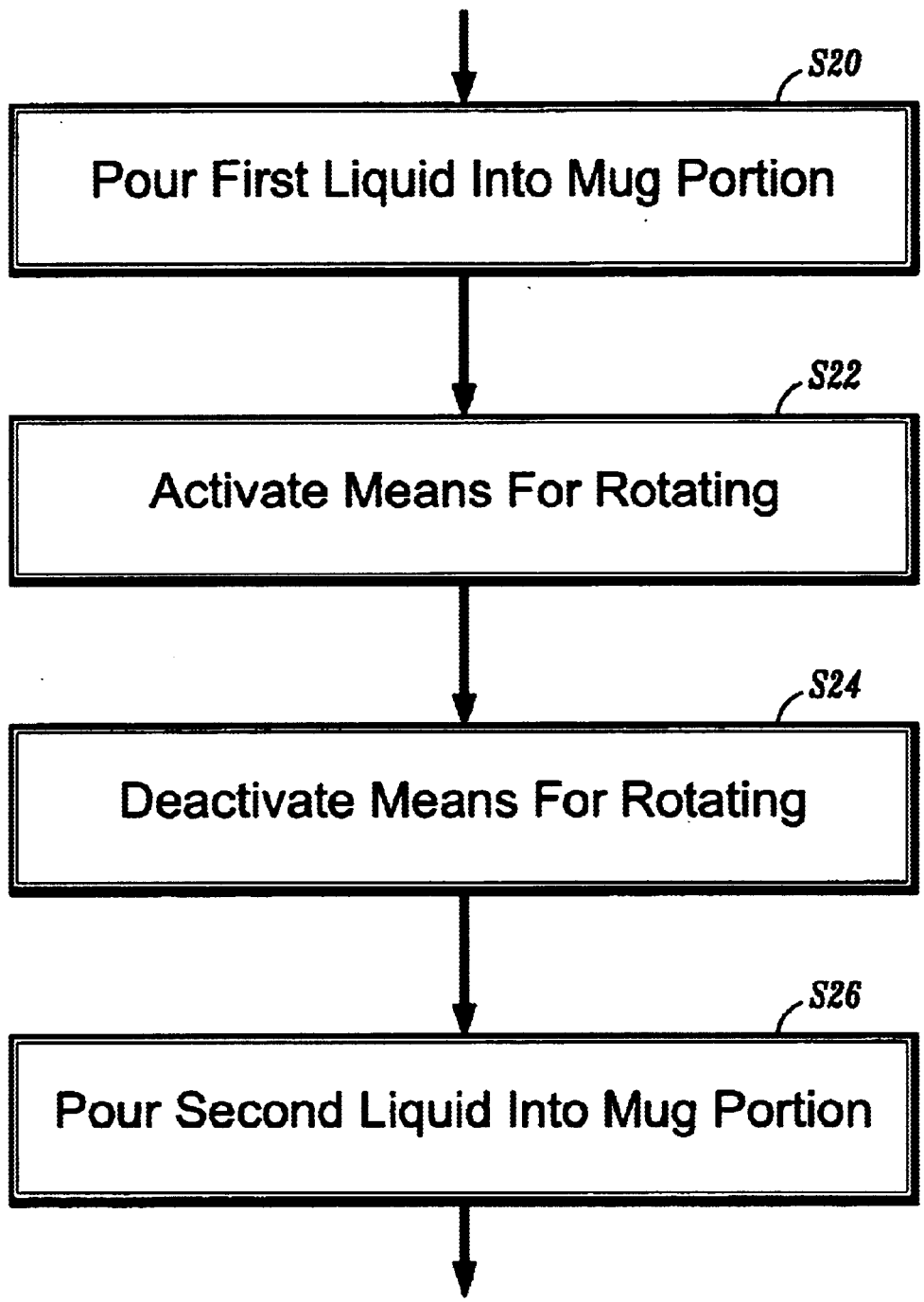
FIG. 2 is a flow chart illustrating a method of making a frothed beverage in a mug according to an embodiment of the present invention.

FIG. 2 illustrates a method of frothing a liquid in a mug according to one embodiment of the present invention. In step S20, a predetermined quantity of a first liquid is poured into the mug portion such that a level of the first liquid in the mug portion is at least at a height of the whisk. In step S22, the means for rotating the whisk is activated to aerate the first liquid. In step S24, the means for rotating the whisk is deactivated after the first liquid has achieved a desired frothy consistency. In step S26 a second liquid may be added to the mug portion such that the first liquid having the desired frothy consistency floats on top of the second liquid, after which, the user can drink the frothed first liquid and the second liquid directly from the mug portion 12.

Figure 7:
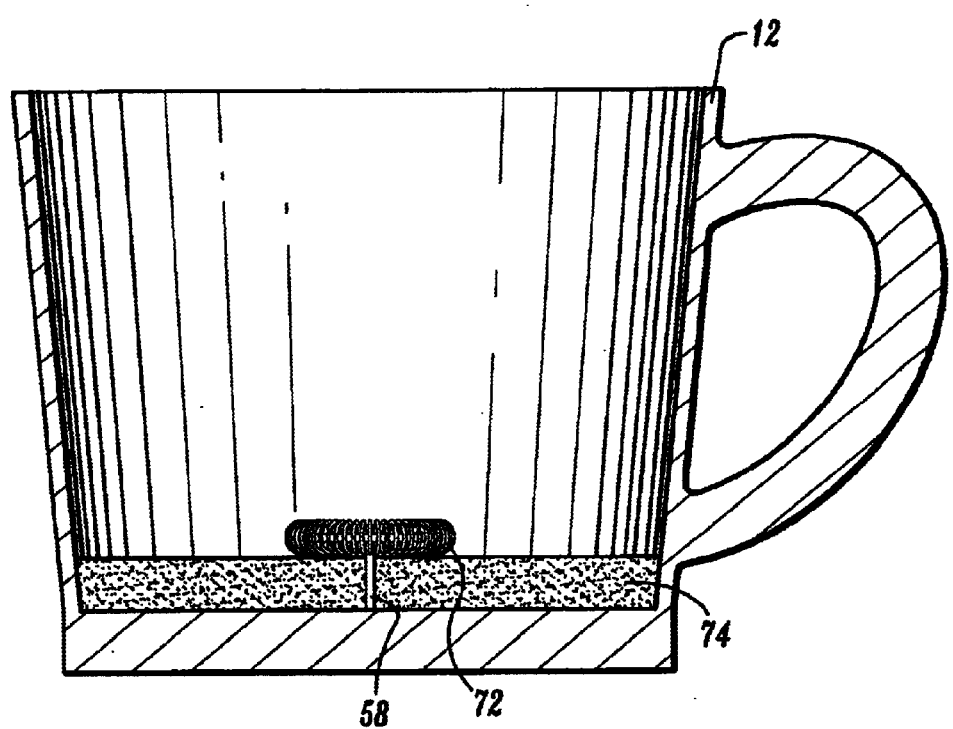
FIG. 7 is a diagram illustrating a preferred level of a first liquid in the mug portion according to an embodiment of the present invention.

The quantity of first liquid poured into the mug portion in step S20 may vary, however, the level of the first liquid 74 in the mug portion is preferably at least at the height of the whisk, that is, at the height of a lower portion of coil 72 (see FIG. 6) of the whisk 18, such that the remainder of the coil is exposed to air as shown in FIG. 7, for example. Alternatively, the level of the first liquid may be such that the upper half of coil 72 of the whisk 18 is exposed to the air and the lower half of the coil is submerged in the first liquid. In addition, the level of the first liquid may be above the height of the whisk 18. In such an embodiment, the rotation of the whisk creates a vortex which causes the level of the first liquid in the vicinity of the whisk to drop as the whisk rotates. In this manner, the rotation of the whisk incorporates air into the first liquid to produce a frothy consistency. Thus, the level of the first liquid is preferably at least equal to the height of the whisk, that is, at least at the height of the lower portion of the coil 72 of the whisk 18.

The activating and deactivating steps S22 and S24 are performed using a spring-biased button or other type of switch.

Figure 3:
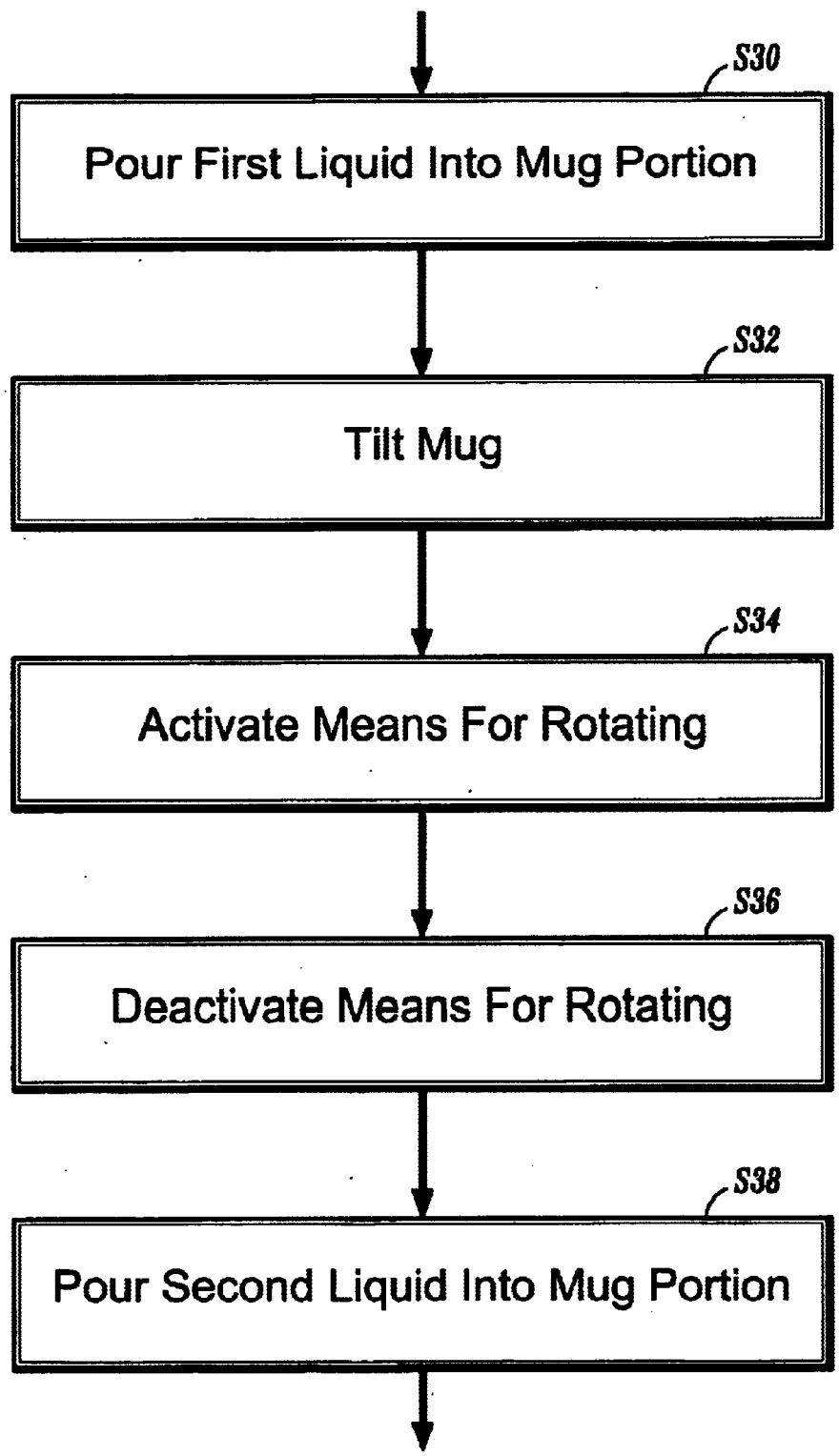
FIG. 3 is a flow chart illustrating a method of making a frothed beverage in a mug according to an embodiment of the present invention.

FIG. 3 illustrates another method of frothing a liquid in a mug including a mug portion and a whisk extending into the mug portion from a base which supports the mug portion and the whisk and provides means for rotating the whisk to froth the liquid. In step S30 a quantity of a first liquid, such as, for example, milk, cream, skim milk, or a nondairy creamer, is poured into the mug portion. At step S32, the mug is tilted such that a first portion of the whisk is submerged in the first liquid and a second portion of the whisk is exposed to the air. At step S34, the means for rotating the whisk is activated to rotate the whisk in the mug portion so as to aerate the first liquid. The means for rotating the whisk is deactivated after the first liquid has a desired frothy consistency at step S36. At step S38, a second liquid, such as coffee or any other beverage may be poured into the mug portion. Since the first liquid has the desired frothy consistency, the frothed first liquid will tend to float to the top of whatever second liquid is added to the mug so that a user of the mug can then enjoy a beverage with a frothed liquid topping that is prepared all in one vessel.

The quantity of first liquid poured into the mug portion in step S30 may vary, however, it is preferable to ensure that the quantity is sufficiently small to allow the whisk to be at least partially exposed to the air when the mug is tilted in step S32. Exposing a portion of the whisk to the air aids in quickly incorporating air into the first liquid to produce a frothy consistency as the whisk rotates. In addition, after tilting the mug and activating and deactivating the means for rotating the whisk in steps S32 to S36, the mug may be tilted in another direction. The means for rotating the whisk may then be activated and deactivated in a manner similar to that of steps S34 and S36. Tilting the mug in another direction while frothing aids in providing a more even frothy consistency in the first liquid.

The means for rotating the whisk may be a motor. In a preferred embodiment of the present invention, the means for rotating is an electric motor that is activated and deactivated in steps S34 and S36, respectively, using a button 19 (see FIG. 1) or other electrical switching device that is mounted on a side of the base.

As noted above, the second liquid may be poured into the mug portion at step S38 resulting, for example, in a cup of coffee with a layer of frothed milk on top. While it is currently popular to top various coffee beverages with frothed milk, any beverage may be poured into the mug portion in step S38 such as hot chocolate, for example.

Figure 4:
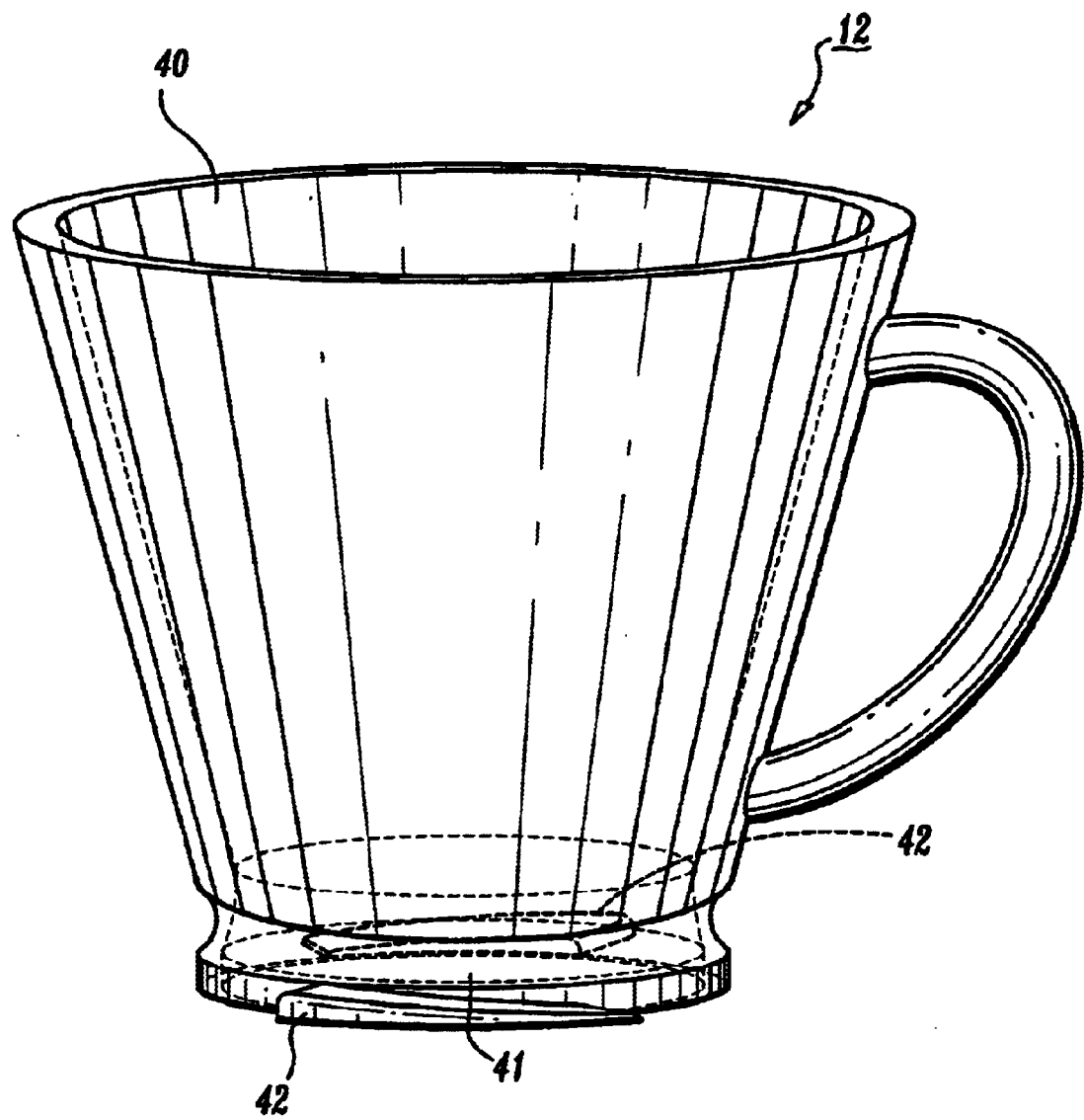
FIG. 4 is a diagram of a mug portion of a motorized frothing mug according to an embodiment of the present invention.

A mug portion 12 of a motorized frothing mug is described in further detail with reference to FIG. 4. The mug portion 12 can be somewhat cylindrical in shape and is open on a top end 40 and a bottom end 41. A diameter of the top end 40 is preferably slightly larger than a diameter of the bottom end 41. In one embodiment, a securing flange or flanges 42 may be formed around the bottom end 41 of the mug portion 12 to secure the mug portion 12 to the base 14.

Figure 5:
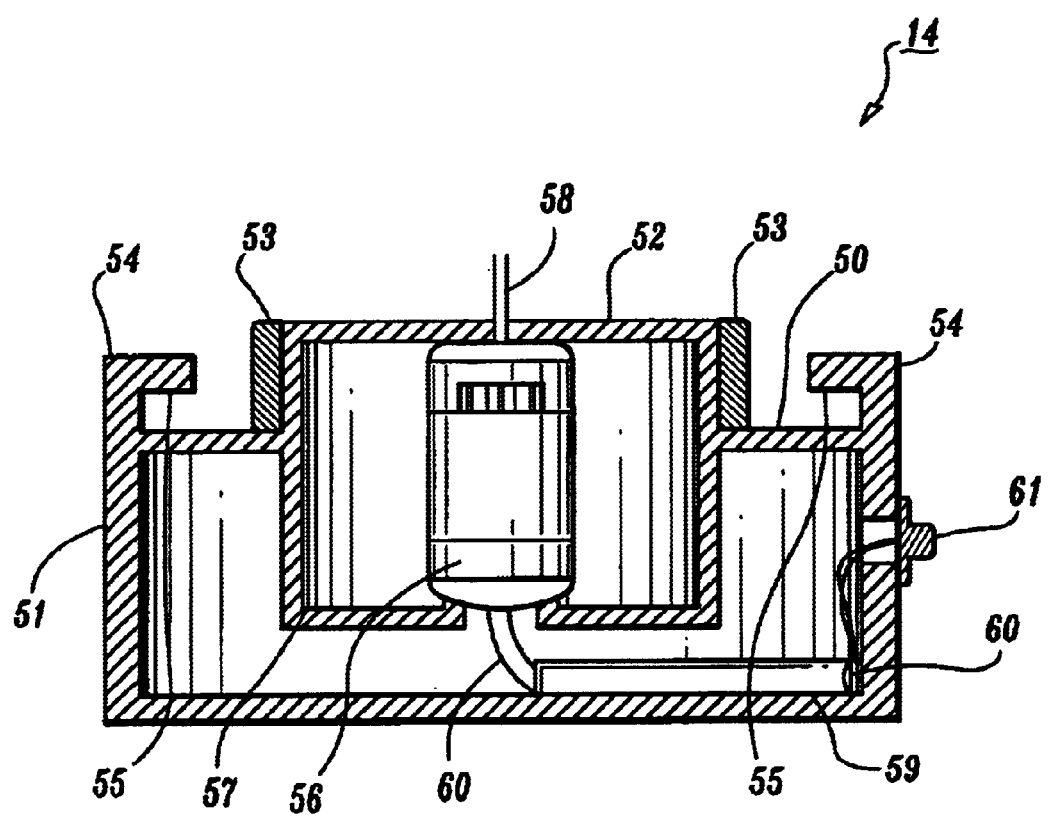
FIG. 5 is a diagram of a base of a motorized frothing mug according to an embodiment of the present invention.

The base 14, according to an embodiment of the present invention, is illustrated in further detail with reference to FIG. 5. The base 14 can be somewhat cylindrical in shape. The base 14 preferably includes a top surface 50 surrounded by a peripheral wall 51. A center section 52 of the top surface 50 of the base 14 is preferably raised. A rubber ring 53 may be formed around the raised center section 52 of the base 14. The diameter of the rubber ring 53, is preferably slightly smaller than that of the bottom end 41 of the mug portion 12 such that the rubber ring 53 along with the raised center section 52, fit within the bottom end 41 of the mug portion 12. The rubber ring 53 prevents liquid from escaping from the bottom end 41 of the mug portion 12. An outer ring 54 may be formed around the periphery of the top surface 50 of the base 14. A securing ridge or ridges 55 may be formed on an inner surface of the outer ring 54. In a preferred embodiment, the securing ridge 55 does not extend around the entire outer ring 54 such that when the mug portion 12 is mounted on the base 14, there is clearance between the securing flange 42 and the securing ridge 55 allowing the bottom end 41 of the mug portion 12 to contact the top surface 50 of the base 14 in the area between the rubber ring 53 and the outer ring. The mug portion 12 may then be rotated relative to the base 14 such that the securing flange 42 fits between the securing ridge 55 and the top surface 50 of the base 14 to secure the mug portion 12 to the base 14. More specifically, as the mug portion 12 is rotated, the securing flange 42 comes into contact with the securing ridge 55, thus ensuring a liquid tight fit between the mug portion 12 and the base 14. In this manner, the mug portion 12 is securely fastened to the base 14 when desired, but can be easily removed from the base simply by rotating the mug portion in the opposite direction.

In one embodiment, the base 14 also houses an electric motor 56 used to rotate the whisk 18. A motor mount 57 is preferably positioned under the raised center section 52 of the top surface 50 of the base 14. The electric motor 56 is mounted in the motor mount 57 such that a shaft 58 of the electric motor extents through the top surface 50 of the base 14. More specifically, the shaft 58 extends through the raised center section 52 of the top surface 50 of the base 14. The whisk 18 is mounted on the portion of the shaft 58 extending through the top surface 50 of the base 14. While an electric motor is utilized as the means for rotating in the embodiment of the present invention illustrated in FIG. 5, the present invention is not limited to such an embodiment. The means for rotating the whisk may be any device that can rotate the whisk, such as a manually wound spring.

The base 14 also may include a battery mount or mounts 59 in which a battery or batteries (not shown) may be mounted to provide electrical power to the electric motor 56. The battery mount 59 preferably includes a battery terminal or terminals 60 for electrically connecting the battery to the electric motor 56. A power button 19, 61 or other electrical switching device may be electrically connected between the battery terminal 60 and the electric motor 56 to control electric power provided to the electric motor from the battery.

The whisk 18 is mounted on the shaft 58 of the electric motor 56 such that the whisk rotates with the shaft when the electric motor is activated. A rubber washer or other sealing element (not shown) may be provided around the shaft 58 where it extends through the top surface 50 of the base 14 to prevent liquid from contacting the electric motor 56.

Figure 6:
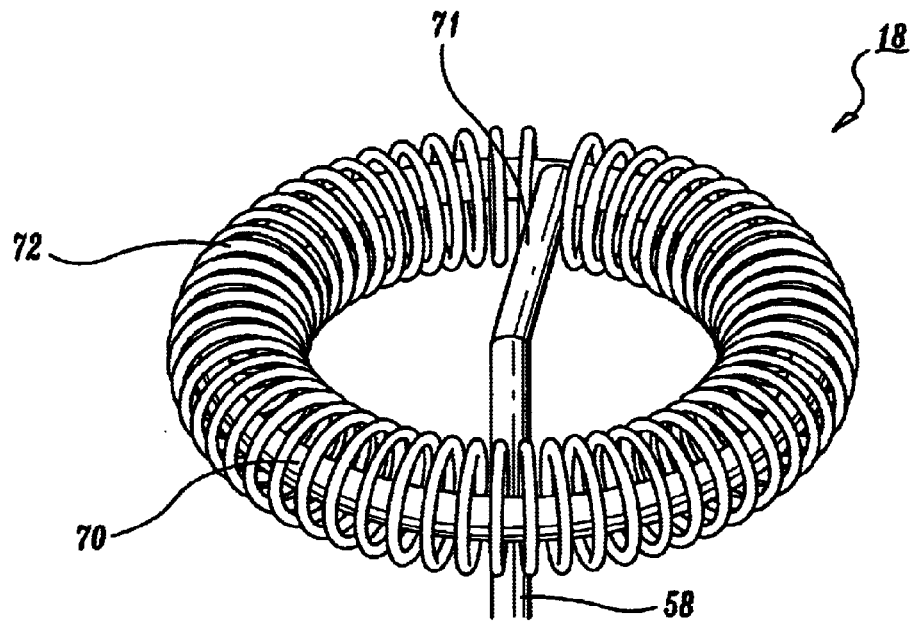
FIG. 6 is a diagram of a whisk of a motorized frothing mug according to an embodiment of the present invention.

The whisk 18, according to one embodiment of the present application, is illustrated in greater detail with reference to FIG. 6. The whisk 18 preferably includes a ring 70 positioned in a substantially horizontal position. The shaft 58 is connected to the ring 70 via a connecting member 71. The connecting member 71 is connected to the shaft 58 substantially at the center of the ring 70. A coil 72 is coiled around the ring 70 such that a space is formed between the ring 70 and the periphery of the coil 72. This construction is beneficial for incorporating air into the first liquid as the whisk 18 is rotated at high speed. Alternatively, the coil 72 and ring 70 need not be horizontal, but may be mounted at an angle with respect to base 14. While the present application describes a specific embodiment of a whisk, the term whisk as used herein refers to any wire utensil used to froth liquid, and especially coiled or looped wire utensils made of any suitable material such as metal, plastic, wood, et cetera.

While the present application discloses specific embodiments of an electrically operated frothing mug and a method of using the same, it should be understood that many variations are possible. The present application is intended to extend to all such variations permissible under the claims appended hereto.

What is claimed is:

1. A method of preparing and drinking a beverage having a first liquid, which is aerated, and a second liquid in a mug having a mug portion and a coil loop whisk extending into the mug portion from a base which supports the mug portion and the coil loop whisk and provides means for rotating the coil loop whisk, comprising the steps of:

pouring a quantity of the first liquid into the mug portion such that a level of the first liquid in the mug portion is at least at a height of the coil loop whisk;

activating the means for rotating the coil loop whisk to rotate the coil loop whisk so as to aerate the first liquid;

deactivating the means for rotating the coil loop whisk after the first liquid has achieved a desired frothy consistency;

pouring the second liquid into the mug portion such that the first liquid having the desired frothy consistency floats on the second liquid; and drinking the beverage from the mug portion.

2. The method of claim 1, wherein the level is above the height of the coil loop whisk such that when the means for rotating the coil loop whisk is activated to rotate the coil loop whisk, the level of at least a portion of the first liquid drops such that the rotation of the coil loop whisk aerates the first liquid.

3. The method of claim 1, wherein the level is such that a top portion of a coil portion of the coil loop whisk is exposed to air and a bottom portion of the coil portion is immersed in the first liquid.

4. The method of claim 1, wherein the means for rotating the coil loop whisk is an electric motor.

5. The method of claim 4, wherein the activating step and the deactivating step are accomplished utilizing a switch.

6. A method of preparing and drinking a beverage having a first liquid, which is aerated, and a second liquid in a mug having a mug portion and a coil loop whisk extending into the mug portion from a base which supports the mug portion and the coil loop whisk and provides a means for rotating the coil loop whisk comprising the steps of:

pouring a quantity of the first liquid into the mug portion;

tilting the mug in a first direction such that a portion of a coil portion of the coil loop whisk is immersed in the first liquid and a remaining portion of the coil portion is exposed to air;

activating the means for rotating the coil loop whisk to rotate the coil loop whisk so as to aerate the first liquid;

deactivating the means for rotating the coil loop whisk after the first liquid has achieved a desired frothy consistency;

pouring the second liquid into the mug portion such that the first liquid having the desired frothy consistency floats on the second liquid; and drinking the beverage from the mug portion.

7. The method of claim 6 further comprising the steps of:

tilting the mug in a second direction such that a different portion of the coil portion is immersed in the first liquid and a different remaining portion of the coil portion is exposed to air;

activating the means for rotating the coil loop whisk to rotate the coil loop whisk so as to aerate the first liquid; and deactivating the means for rotating the coil loop whisk after the first liquid has achieved a desired frothy consistency.

8. The method of claim 6, wherein the means for rotating the coil loop whisk is an electric motor.

9. The method of claim 8, wherein the activating step and deactivating step are accomplished utilizing a switch.

10. A mug for preparing and drinking a beverage having a first liquid, which is aerated; and a second liquid comprising:

a mug portion adapted to hold the first liquid to be aerated, to receive and hold the second liquid with the first liquid after the first liquid has achieved a desired frothy consistency in the mug, and to be drunk from;

a coil loop whisk extending into the mug portion and adapted to aerate the first liquid;

a base on which the mug portion is mounted and that supports the mug portion and the coil loop whisk; and means for rotating the coil loop whisk housed in the base with a shaft extending through a top surface of the base into the mug portion and connected to the coil loop whisk, wherein the means for rotating the coil loop whisk rotates the coil loop whisk to aerate the first liquid to a desired frothy consistency before the second liquid is added.

11. The mug of claim 10, wherein the mug portion has an open top end and an open bottom end, and wherein the bottom end includes a securing flange.

12. The mug of claim 10, wherein the base comprises:

a top surface with a raised center section;

a peripheral wall extending around an outer periphery of the base;

an outer lip positioned on the top surface around the outer periphery of the base such that a space is formed between the raised center section and the outer lip; and a securing ridge formed on an inner surface of the outer lip around at least a portion of the outer lip such that the securing ridge interacts with the securing flange of the mug portion to secure the mug portion to the base.

13. The mug of claim 12, further comprising a rubber ring formed around the raised center section of the top surface of the base where the raised center section and the rubber ring fit inside the bottom end of the mug portion when the mug portion is mounted on the base to prevent liquid from leaking out of the mug portion.

14. The mug of claim 12, wherein the means for rotating the coil loop whisk is an electric motor.

15. The mug of claim 14, wherein the base further comprises:

a battery mount adapted to mount at least one battery in the base to provide electrical power to the electric motor, wherein the battery mount includes at least one battery terminal electrically connected to the electric motor.

16. The mug of claim 15, wherein the base further comprises:

a switch mounted on the peripheral wall of the base and electrically connected between the battery terminal and the electric motor to control the electrical power provided to the electric motor.

* * * * *